United States Patent
Borden et al.

(10) Patent No.: US 6,661,135 B2
(45) Date of Patent: Dec. 9, 2003

(54) MULTI-POLE HIGH SPEED GENERATOR WITH A MODULAR RECTIFIER CIRCUIT

(75) Inventors: Raymond W Borden, Farmingdale, NJ (US); Jim Lengel, Oro Valley, AZ (US); Kieran Doherty, Oro Valley, AZ (US); Gregor McDowall, Tucson, AZ (US); Gerald Tornquist, Tucson, AZ (US); Ming Xu, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 46 days.

(21) Appl. No.: 09/834,595

(22) Filed: Apr. 13, 2001

(65) Prior Publication Data

US 2002/0149276 A1 Oct. 17, 2002

(51) Int. Cl.⁷ .............................................. H02K 11/00
(52) U.S. Cl. ...................... 310/68 D; 310/71; 310/67 R
(58) Field of Search ................................ 310/68 D, 43, 310/71, 67 R, 254, 262; 363/141, 144, 145

(56) References Cited

U.S. PATENT DOCUMENTS

| | | |
|---|---|---|
| 3,412,271 A | 11/1968 | Hall |
| 3,829,725 A | 8/1974 | Petersen et al. |
| 4,052,631 A | 10/1977 | Kuter |
| 4,262,224 A | 4/1981 | Kofink et al. |
| 4,329,603 A | 5/1982 | Ballard |
| 4,797,590 A | 1/1989 | Raad et al. |
| 4,896,062 A | 1/1990 | Pollard |
| 4,959,572 A | 9/1990 | Becker |
| 4,959,707 A | 9/1990 | Pinchott |
| 5,001,376 A | 3/1991 | Iseman |
| 5,008,574 A | 4/1991 | Kitahata |
| 5,012,145 A | 4/1991 | Frantz et al. |
| 5,065,484 A | 11/1991 | Pinchott |
| 5,124,603 A | 6/1992 | Hayward et al. |
| 5,138,210 A | 8/1992 | Crickmore et al. |
| 5,365,133 A | 11/1994 | Raad |
| 5,424,593 A | 6/1995 | Vaghani et al. |
| 5,554,898 A | 9/1996 | Howard et al. |
| 5,587,616 A | 12/1996 | Johnsen |
| 5,682,070 A * | 10/1997 | Adachi et al. ................. 310/71 |
| 5,737,210 A * | 4/1998 | Barahia ...................... 363/144 |
| 5,999,078 A | 12/1999 | Herbert |
| 6,072,253 A | 6/2000 | Harpenau et al. |
| 6,205,024 B1 * | 3/2001 | Shih et al. ................... 361/704 |

FOREIGN PATENT DOCUMENTS

WO     PCT/US 02/11465     7/2002

OTHER PUBLICATIONS

Product Specification Sheet, "93B5–2 Variable Frequency AC Generator", Jul. 24, 1990.

* cited by examiner

Primary Examiner—Thanh Lam
(74) Attorney, Agent, or Firm—Robert Desmond, Esq.

(57) ABSTRACT

A multi-pole high speed generator includes a rectifier module assembly that is dimensioned to be mounted within the hub of a high speed generator exciter armature includes a rectifier module assembly includes a substantially flat base that has a plurality of conductive circuit runs formed on it, and which is dimensioned to be mounted within a hub of the exciter. A first diode circuit, which includes an anode and a cathode, has its anode electrically coupled to a first of the plurality of conductive circuit runs. A second diode circuit, which also includes an anode and a cathode, has its cathode electrically coupled to a second of the plurality of conductive circuit runs. A conductive element electrically couples together the cathode of the first diode circuit and the anode of the second diode circuit.

67 Claims, 8 Drawing Sheets

MULTI-POLE HIGH SPEED GENERATOR WITH A MODULAR RECTIFIER CIRCUIT

BACKGROUND OF THE INVENTION

The present invention relates to a multi-pole high speed generator, and, more particularly, to a rectifier module assembly that mounts within a multi-pole high speed generator. The rectifier module has a circuit with improved reliability that rectifies a multi-phase AC signal generated in the exciter armature windings of the multi-pole high speed generator, and provides the rectified DC signal to the field winding of the generator.

Generators that are installed in aircraft typically rotate at relatively high speeds (e.g., 24,000 r.p.m. or greater), and are also typically of the so-called "brushless" generator design. Generally, brushless generators include three distinct generating systems, a permanent magnet generator (PMG), an exciter, and a main generator. The PMG may include a plurality of permanent magnets that rotate with the generator rotor, and which induce a current into a set of windings. This current is typically fed to a regulator or a control device, which in turn outputs a DC signal.

The exciter may include a plurality of stationary field windings, which are electrically coupled to receive the DC signal output from the regulator or control device, and thus develop a magnetic field. The exciter may also include armature windings mounted on the generator rotor, which rotate within this magnetic field. Thus, during rotation an AC current is induced in the exciter armature windings. Typically, the exciter armature windings are wound such that the induced AC current signal is a three-phase AC current signal. Rectifier circuits that rotate with the exciter armature windings rectify the three-phase AC current signal induced in the exciter armature windings. The DC current output from the rectifiers is provided to the main generator.

The main generator includes rotating field windings and stationary armature windings. The rotating field windings are electrically coupled to receive the DC current from the rectifiers and develop a magnetic field that rotates with the rotor. This rotating magnetic field induces a three-phase AC current in the stationary armature windings. This three-phase AC current is then provided to a load.

As noted above, the generators installed in aircraft typically rotate at relatively high speed. Thus, the rectifiers that rotate with the exciter armature, colloquially referred to as "rotating rectifiers," are subjected to relatively high centrifugal loads. One conventional rotating rectifier assembly is arranged radially along a surface or a base within the generator, and thus experiences varying centrifugal loads across its components. Alternatively, another known rotating rectifier assembly is permanently mounted within a rotating housing and thus does not allow easy maintenance and/or replacement.

In addition to the above-noted structural weaknesses, conventional three-phase rotating rectifier circuits include only a single resistor to provide protection for the rectifier diodes. This single resistor is generally a wire-wound resistor, which is itself subject to failure modes resulting from the centrifugal loads it experiences during rotation. Moreover, the electrical failure of this single resistor results in the rectifier circuit being unprotected from voltage and/or current spikes that may occur within the generator.

Hence, there is a need for a multi-pole high speed generator having a rectifier circuit that improves upon the drawbacks identified above. Namely, a rectifier circuit that is less likely to fail from varying radial centrifugal loads and/or that is more reliable, and/or easier to repair and replace.

SUMMARY OF THE INVENTION

The present invention provides a multi-pole high speed generator having a rectifier circuit that is less likely to fail from varying radial centrifugal loads, is more reliable, and is easier to repair and replace.

In one aspect of the present invention, a rectifier module assembly includes a substantially flat base that has a plurality of conductive circuit runs formed on it, and which is dimensioned to be mounted within a hub of the exciter. A first diode circuit, which includes an anode and a cathode, has its anode electrically coupled to a first of the plurality of conductive circuit runs. A second diode circuit, which also includes an anode and a cathode, has its cathode electrically coupled to a second of the plurality of conductive circuit runs. A conductive element electrically couples together the cathode of the first diode circuit and the anode of the second diode circuit.

In another aspect of the present invention, a rectifier module assembly includes a substantially flat base that has a plurality of conductive circuit runs formed on it. A first diode circuit, which includes an anode and a cathode, has its anode electrically coupled to a first of the plurality of conductive circuit runs. A second diode circuit, which also includes an anode and a cathode, has its cathode electrically coupled to a second of the plurality of conductive circuit runs. A resistive element is electrically coupled between the first and second conductive circuit runs. And a conductive element electrically couples together the cathode of the first diode circuit and the anode of the second diode circuit.

In yet another aspect of the present invention, a rectifier circuit for rectifying a multi-phase AC signal generated in a plurality of exciter armature windings of a multi-pole high speed generator and providing a DC signal to a field winding of the generator includes a plurality of parallel-connected rectification circuits. Each of the rectfication circuits includes an AC input terminal for receiving one phase of the multi-phase AC signal, and first and second DC output terminals for providing the DC signal to the field winding. Each of the rectification circuits further includes a first diode circuit, a second diode circuit, and a resistive element. The first diode circuit has its anode electrically coupled to the AC input terminal and its cathode electically coupled to the first DC output terminal. The second diode circuit has its cathode electrically coupled to the AC input terminal and its anode electrically coupled to the second DC output terminal. The resistive element is electrically coupled between the first and second DC output terminals.

Other features and advantages of the high speed generator will become apparent from the following detailed description, taken in conjunction with the accompanying drawings, which illustrate, by way of example, the principles of the invention.

DETAILED DESCRIPTION OF THE INVENTION

Figure 1:
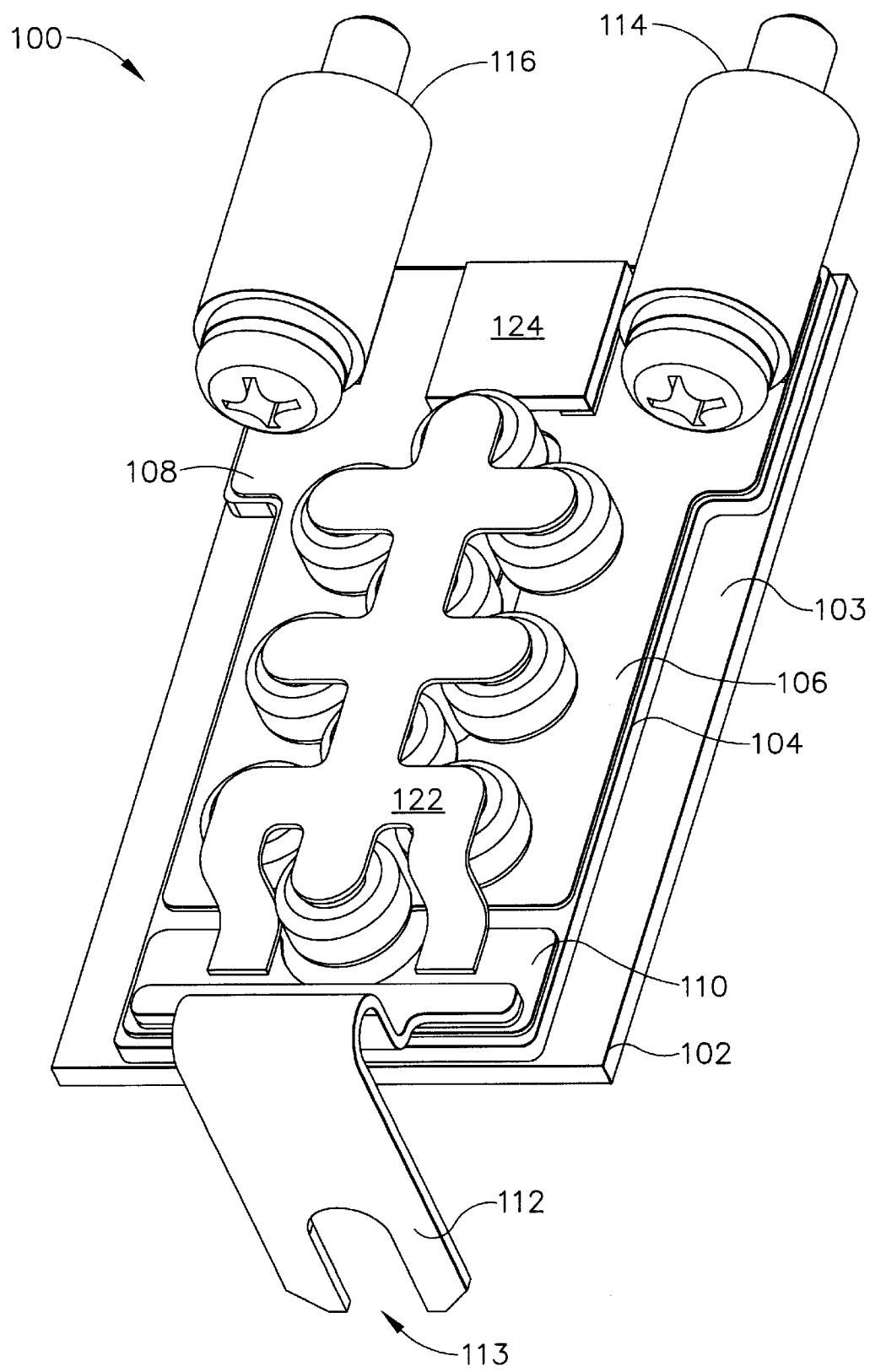
FIG. 1 is a perspective view of a preferred embodiment of a rectifier module assembly according to the present invention.
Figure 2:
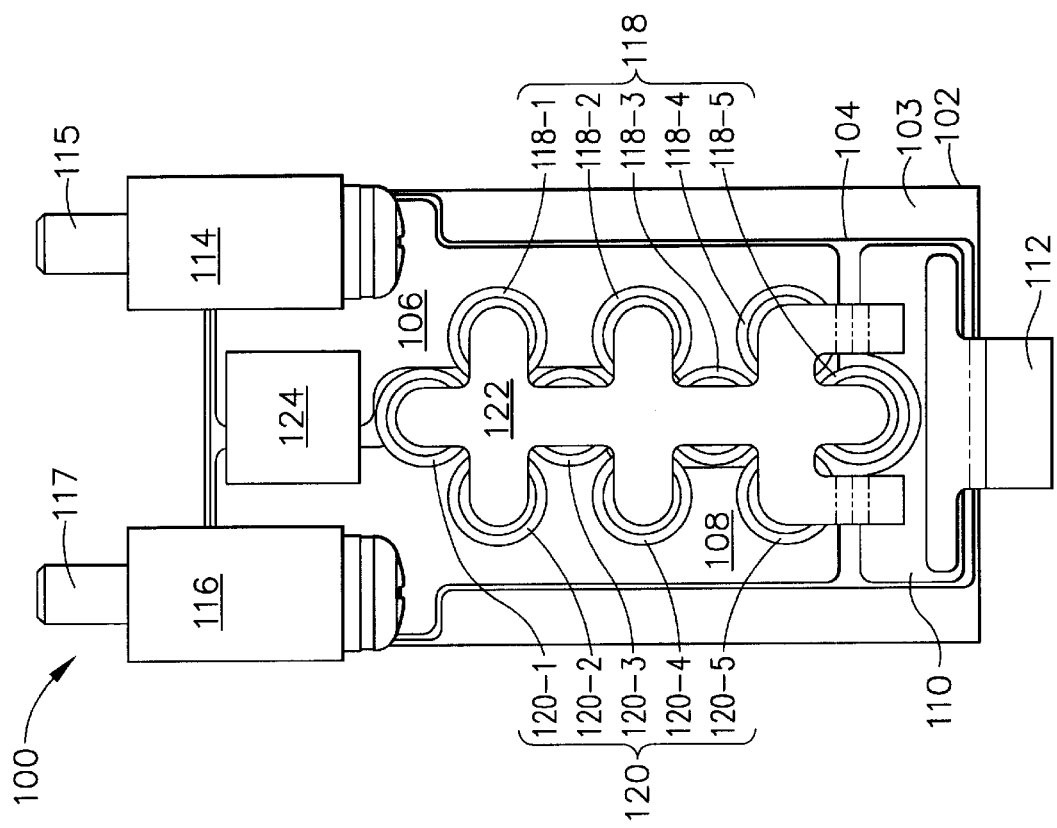
FIG. 2 is a top view of the rectifier module assembly depicted in FIG. 1.

A perspective view and a top view of a preferred embodiment of a rectifier module assembly are depicted in FIGS. 1 and 2, respectively. As depicted therein, the preferred rectifier module assembly 100 includes a substantially flat base 102 onto which a plurality of conductive circuit runs, terminals, and various components are formed and/or mounted. The base is preferably formed of a metallic or metal/ceramic material. A non-conductive substrate 104, formed preferably of a ceramic material, is formed on a surface 103 of the base 102, to insulate the base 102 from the electrically conducting portions of the assembly 100. It will be appreciated that ceramic is only exemplary of a preferred material for the non-conductive substrate 104, and that other materials may also be used.

Figure 3:
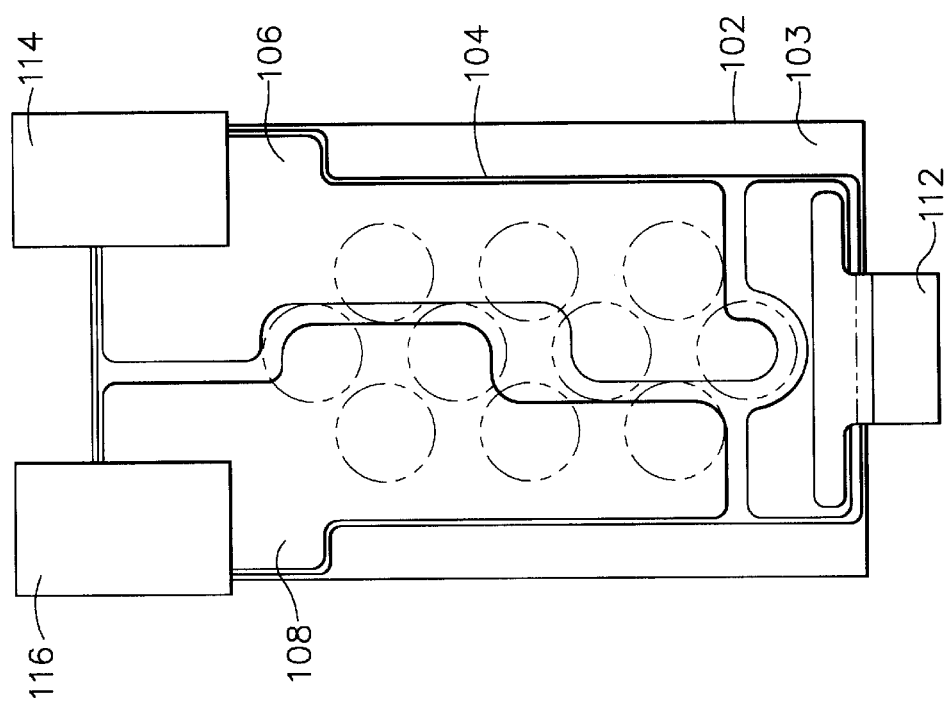
FIG. 3 is a top view of the rectifier module assembly depicted in FIG. 1, with various components thereof depicted in phantom.

The plurality of conductive circuit runs formed on the base 102, and interposed with the non-conductive substrate 104, includes at least a first conductive circuit run 106, a second conductive circuit run 108, and a third conductive circuit run 110. As shown more particularly in FIG. 3, which, for additional clarity, provides a top view of the rectifier module assembly 100 with various components shown in phantom, the circuit runs 106, 108, 110 are formed in a pattern that maximizes the use of the surface area of the base 102. It will, of course, be appreciated that the particular pattern depicted in FIG. 3 is only exemplary of one of the numerous other patterns that could be utilized with the present invention. Each of these conductive circuit runs 106, 108, 110 is preferably a copper-based conductive material.

As will become more apparent when the electrical equivalent circuit of the rectifier module assembly 100 is discussed, the first and second conductive circuit runs 106, 108 conduct a direct current (DC) signal and the third conductive circuit run 110 conducts an alternating current (AC) signal, when the rectifier assembly 100 is properly connected into an operating high speed generator. More particularly, and with reference once again to FIGS. 1 and 2, an AC signal is received by the rectifier module assembly 100 via an AC input terminal 112 and, after rectification, a DC signal is output from the rectifier module assembly 100 via first and second DC output terminals 114, 116.

Referring now to FIGS. 1, 2, and 3 together, it can be seen that a diode circuit is connected to each of the first 106 and second 108 conductive circuit runs. Specifically, a first diode circuit 118 has its anode electrically coupled to the first conductive circuit run 106, and a second diode circuit 120 has its cathode electrically coupled to the second conductive circuit run 108. More specifically, the first 118 and second 120 diode circuits are each formed of a plurality of individual diodes 118-1, 118-2, . . . 118-n, 120-1, 120-2, . . . 120-n, electrically connected in parallel with one another. Thus, the anodes of each of the individual diodes 118-1, 118-2, . . . 118-n that form the first diode circuit 118 are electrically coupled to the first conductive circuit run 106, and the cathodes of each of the individual diodes 120-1, 120-2, . . . 120-n that form the second diode circuit 120 are electrically coupled to the second conductive circuit run 108. Using a plurality of parallel-connected individual diodes allows the size of the diodes making up each diode circuit 118, 120 to be reduced. Moreover, failure of a single diode in one of the diode circuits 118, 120 will not result in failure of the entire rectifier circuit. The number of individual diodes that make up each of the first 118 and second 120 diode circuits may vary. However, in a preferred embodiment each diode circuit 118, 120 is made up of five individual diodes, as explicitly depicted in FIGS. 1 2, for a total of ten diodes, each rated at 1000 volts with a 2 microsecond recovery time. Additionally, and while not limited thereto, in the preferred embodiment, each of the individual diodes is a glass encapsulate-type diode. This type of diode is preferred since it allows for the use of a fluid, such as oil, as a cooling medium for the rectifier module assembly 100.

As will be more particularly discussed and described below, the diode circuits 118, 120 are electrically coupled together to form a full-wave bridge rectifier circuit. Thus, since the anode of the first diode circuit 118 and the cathode of the second diode circuit 120 are connected to the first 106 and second 108 conductive circuit runs, respectively, each of these circuit's cathode and anode, respectively, are electrically coupled together. A conductive element 122, which is preferably formed of beryllium-copper (BeCu), or alternatively of such non-limiting examples as Cu/INVAR, is provided for this function. More particularly, as shown in FIG. 1, the conductive element 122 is connected to the terminals of each of the individual diodes 118-1, 118-2, . . . 118-n, 120-1, 120-2, . . . 120-n that are not connected to either of the first 106 or second 108 conductive circuit runs. The conductive element 122 is further connected to the third conductive circuit run 108. Thus, the AC signal received on the third conductive circuit run 110, via the AC input terminal 112, is conducted to the cathode and anode of the first 106 and second 108 diode circuits, respectively, by the conductive element 122, for rectification. It is noted that, while the AC input terminal 112 may take any one of numerous shapes and include one or more connection openings therein, the AC input terminal 112 preferably includes an open-ended slot 113 for electrically coupling the rectifier assembly 100 to one of the exciter armature windings. This particular preferred connection will be discussed further below.

A resistive element 124 is connected between the first 106 and second 108 conductive circuit runs. Thus, the resistive element 124, as will be described and depicted more explicitly herein below, is electrically connected in parallel with each of the first 118 and second 120 diode circuits, and provides electrical protection for each. The resistive element 124, in a preferred embodiment, has a resistance of 300 ohms and a power rating of 100 watts, though these ratings may be changed to meet the specific requirements of the generator. Additionally, the resistive element 124 may be one of many resistor designs known in the art including, but not limited to, ceramic, wire-wound, and semiconductor resistors. However, the resistive element 124 is preferably a flat, thin-film resistor. This type of resistor is small and, because it can be formed into a flat orientation, the centrifugal load is distributed evenly across the resistor body.

Finally, the first 114 and second 116 DC output terminals, which are connected to the first 106 and second 108 conductive circuit runs, respectively, are used to couple the rectified DC signal from the first and second diode circuits 118, 120 to an unillustrated field winding in the multi-pole high speed generator. The DC output terminals 114, 116 may be configured into any one of numerous configurations; however, in a preferred embodiment, the DC output terminals 114, 116 are configured to include captured screws 115, 117 that secure, and electrically couple, the rectifier module assembly 100 to the unillustrated field winding.

Preferably, the diodes 118-1, 118-2, . . . 118-n, 120-1, 120-2, . . . 120-n, the first and second DC output terminals 114, 116, and the AC input terminal 112, are coupled to the rectifier module assembly 100 by a brazing process. An integral brazed module provides improved structural integrity over other known methods of component connection. It will be appreciated that brazing is only exemplary of the preferred embodiment and that other known connection processes, such as soldering, or the use of conductive epoxies, are also encompassed by the present invention.

Figure 4:
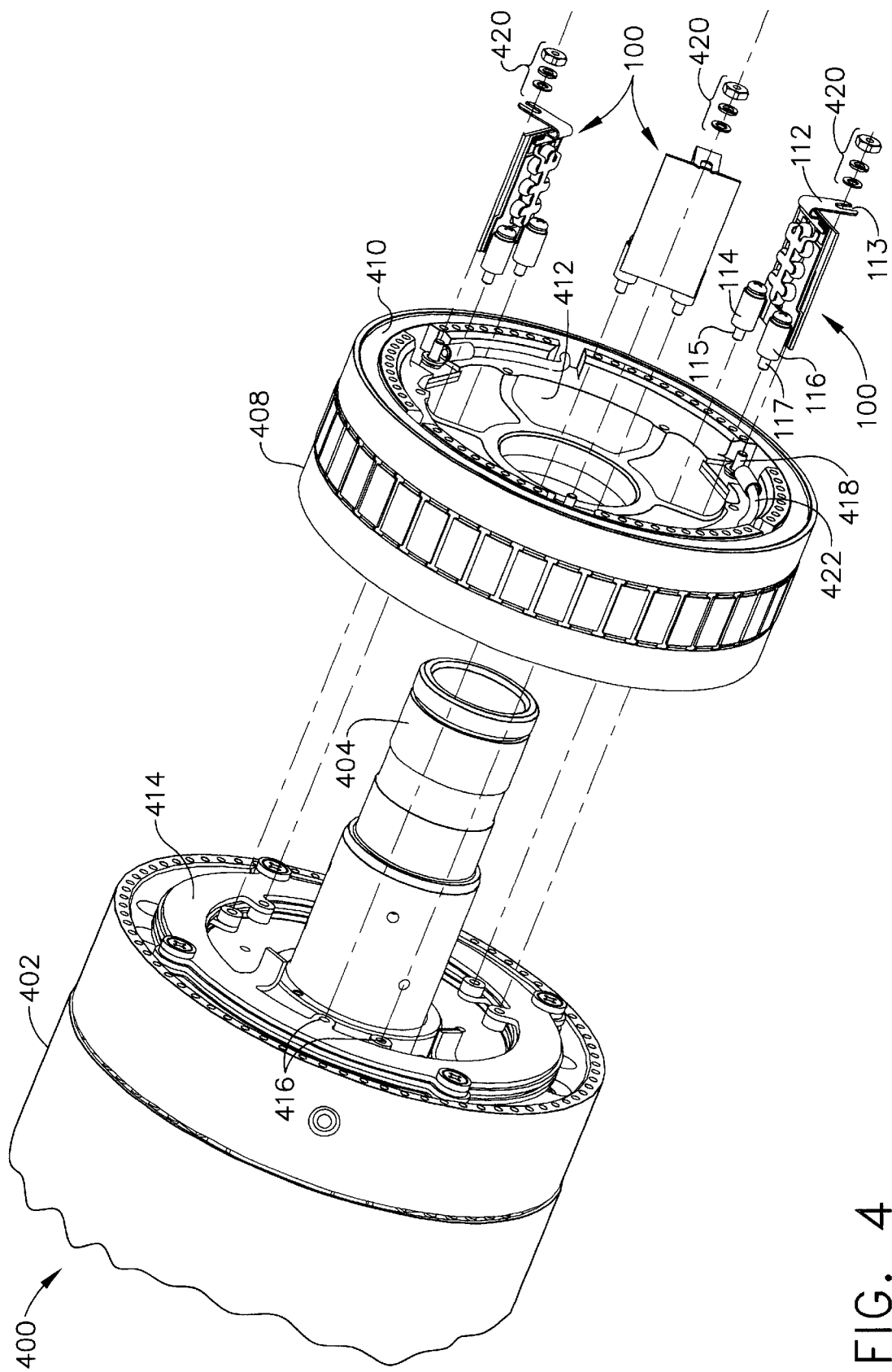
FIG. 4 is an exploded view of a portion of a high speed generator rotor assembly and exciter armature depicting the physical placement therein of one or more of the rectifier module assemblies depicted in FIG. 1.
Figure 5:
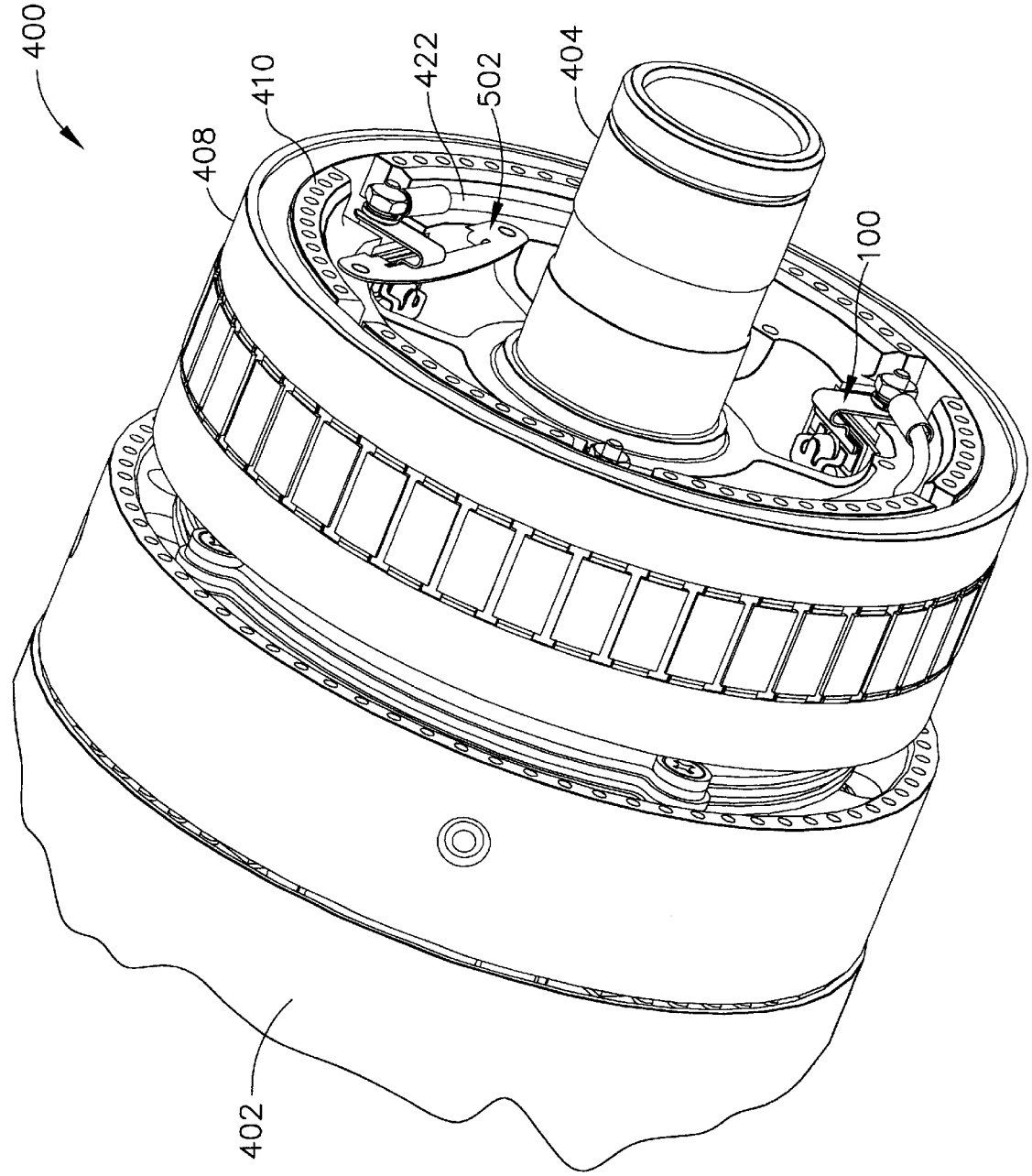
FIG. 5 is a perspective view of the rotor assembly and exciter armature depicted in FIG. 4, illustrating the connection of a physical restraint therein of the rectifier module assembly of FIG. 1.

Turning to FIGS. 4 and 5, a discussion of the physical placement of the rectifier module assembly 100 within a high speed generator will now be provided. The rotor assembly portion 400 depicted includes the main rotor 402, which is mounted on a shaft 404. The rotor assembly portion 400 also includes an exciter armature 408 mounted on the shaft 404, via a hub 410. The hub 410 includes a plurality of openings 412 into which a plurality of rectifier module assemblies 100 are inserted equidistantly around the hub (e.g., 120-degrees apart for three modules). These openings 412 each include flat portions against which the rectifier module assemblies 100 rest when mounted therein. The number of rectifier module assemblies 100 depicted in FIG. 4 is three, since the high speed particular generator into which the rectifier modules assemblies 100 are being installed is a three-phase AC generator. It will be appreciated that other numbers of rectifier module assemblies are encompassed by the present invention.

In any case, each rectifier module assembly 100 is inserted into one of the openings 412 and is electrically connected between the main field winding (unillustrated) and the exciter armature 408. Specifically, the first 114 and second 116 DC output terminals are secured, via the captured screws 115, 117, to a set of connection rings 414, via collocated threaded tabs 416 on the connection rings. These connection rings 414 are electrically connected to the main rotor field windings, thus electrically connecting the DC output terminals 114, 116 thereto, as well. At the opposite end of the rectifier module assemblies 100, the opening 113 in the AC input terminal 112 receives a threaded connector 418 therein, and is secured thereto by a series of washers and nuts 420. A conductor 422, which is also coupled to the threaded connector 418, is electrically connected to the exciter armature 408. Thus, the AC input terminal 112 is concomitantly electrically connected to the exciter armature 408. A retaining clamp 502, only one of which is depicted in FIG. 5, further assists in retaining each of the rectifier module assemblies 100 within the hub 410.

Figure 9:
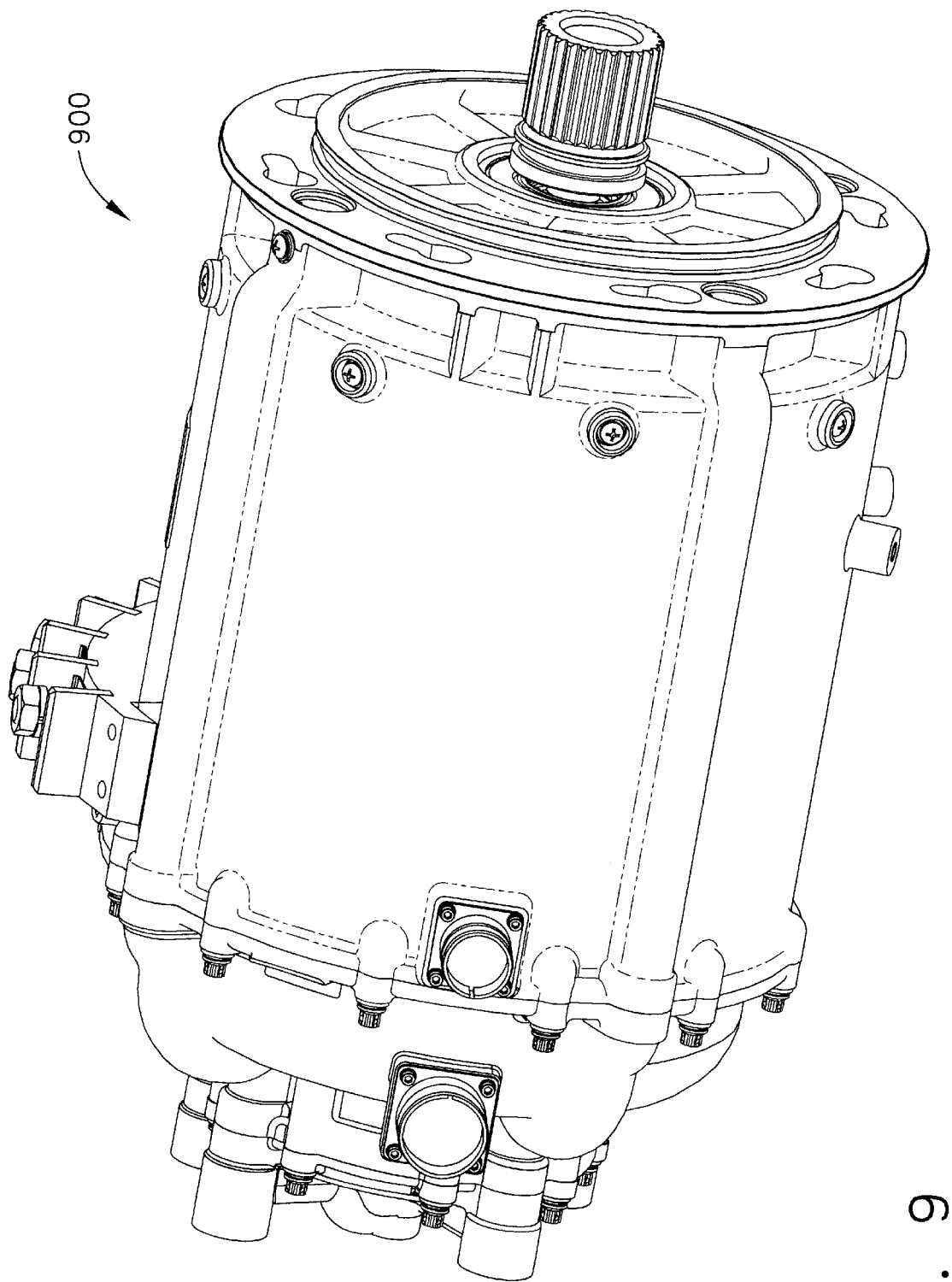
FIG. 9 is a perspective view of a preferred embodiment of a multi-pole high speed generator into which the rectifier circuit module depicted in FIG. 1 is mounted.
Figure 10:
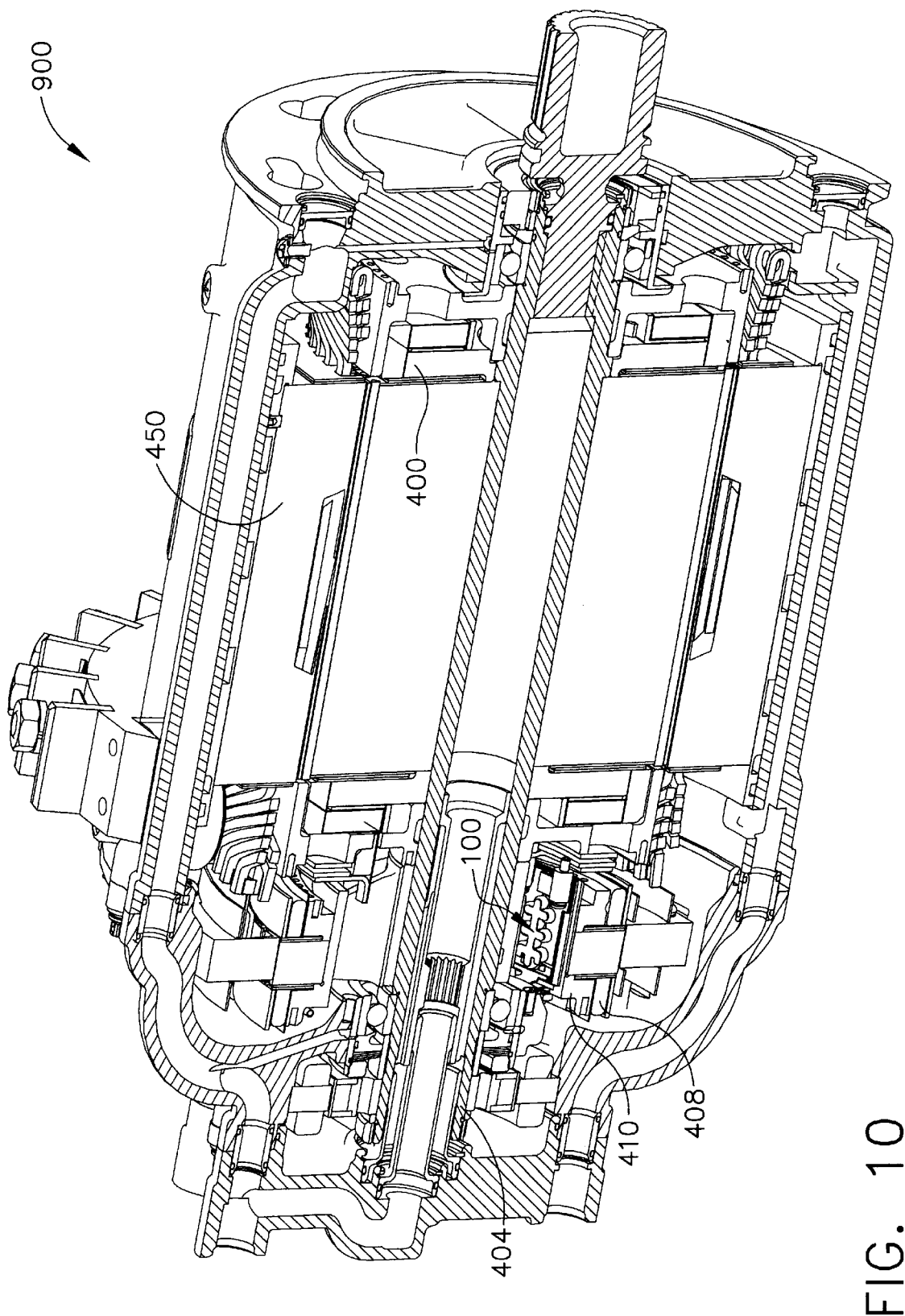
FIG. 10 is a cross section view of the multi-pole high speed generator depicted in FIG. 9.

For completeness of understanding, a perspective view of a preferred embodiment of a multi-pole high speed generator 900 into which the rectifier circuit module assembly 100 is mounted, is depicted in FIG. 9. Additionally, a cross section view, depicting the internal structure of the generator 900, is illustrated in FIG. 10. As depicted therein, the rotor assembly 400 is surrounded by a stationary stator assembly 450. Also depicted is the exciter armature 408 and hub 410, into which one or more of the rectifier module assemblies 100 are removably mounted.

Up to this point, the rectifier module assembly 100 and it placement into the hub 410 of a multi-pole high speed generator has focussed mostly on the structural aspects of the assembly. However, with reference now to FIG. 6, which depicts a preferred embodiment of a rectifier circuit 600 that is formed using the rectifier module assemblies 100 of the present invention, a discussion of the electrical aspects of the rectifier circuit will be provided. It is to be appreciated that the rectifier circuit 600 depicted and described herein is not, however, limited to an embodiment comprising the rectifier circuit modules 100 of the present invention. Rather, the unique electrical structure and function of the rectifier circuit 600 may be embodied using various structural arrangements.

Figure 6:
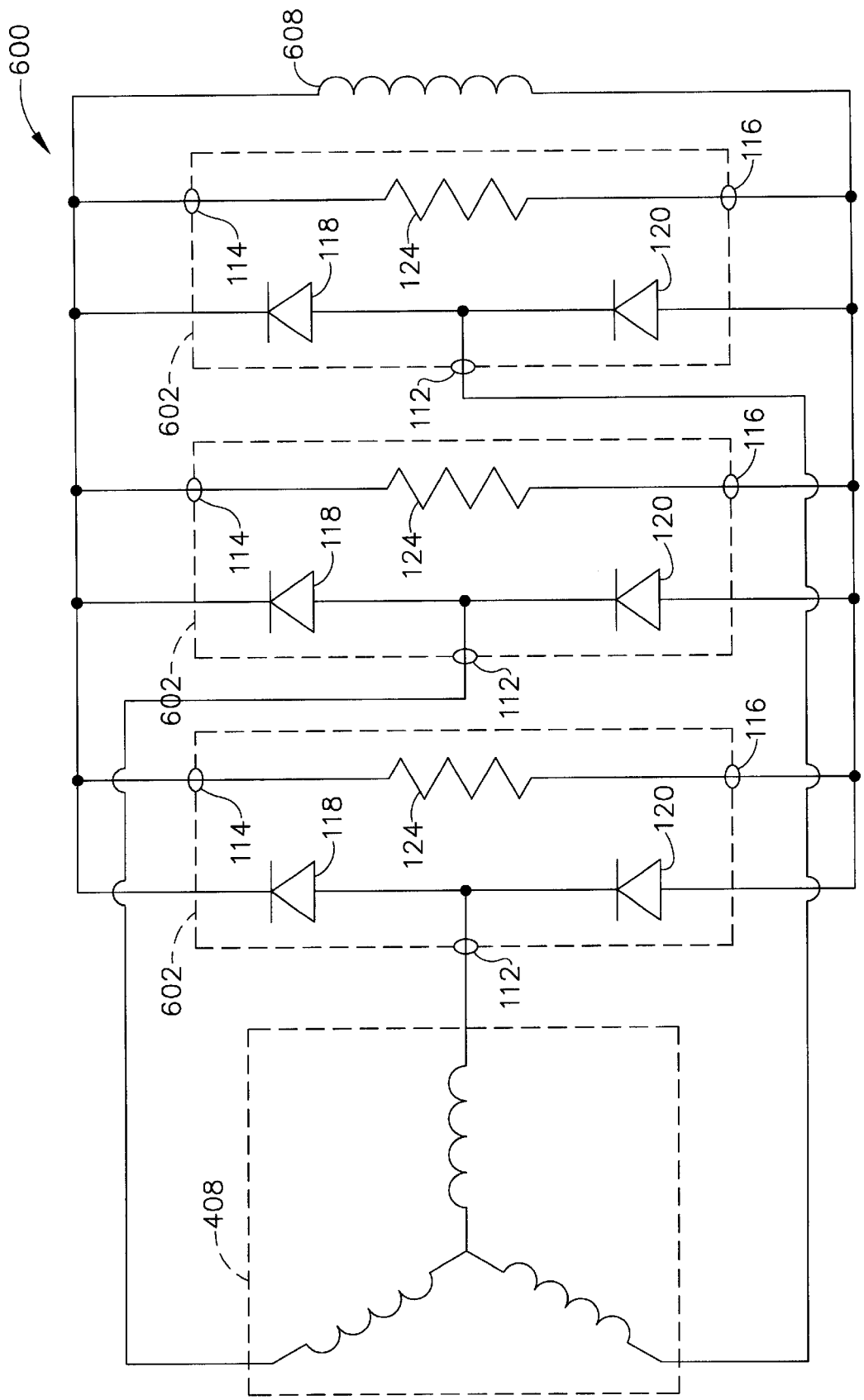
FIG. 6 is a generalized schematic representation of a rotating rectifier circuit that is formed from a plurality of parallel-connected rectifier module assemblies of the present invention.

Focussing attention now on FIG. 6, the rectifier circuit 600 includes a plurality, which in the depicted preferred embodiment is three, of individual rectification circuits 602 connected in parallel with one another. Each of the rectification circuits 602 includes an AC input terminal 612 that is electrically connected to one phase of the three-phase exciter armature 408. The rectification circuits 602 also each include the first 614 and second 616 DC output terminals, like polarities of which are electrically connected one to another and to the main field winding 608, which is schematically depicted in FIG. 6.

The rectification circuits 602 each comprise the first 618 and second 620 diode circuits, which are depicted as single diodes in FIG. 6. As shown, the first 618 and second 620 diode circuits within each rectification circuit are connected together to form a full-wave bridge rectifier. Specifically, as previously discussed above with respect to the structure of the rectifier circuit module 100, the first diode circuit 618 has its anode electrically coupled to the AC input terminal 612 and its cathode electrically coupled to the first DC output terminal 614. Conversely, the second diode circuit 620 has its cathode electrically coupled to the AC input terminal 612 and its anode electrically coupled to the second DC output terminal 616. The resistive element 624 within each rectification circuit 502 is electrically connected in parallel with the first and second diode circuits 618, 620. Thus, as alluded to above, not only do the resistive elements 624 provide individual protection for each diode circuit 618, 620, but the redundancy provided by including a resistive element in each individual rectification circuit 502 increases system reliability.

Figure 7:
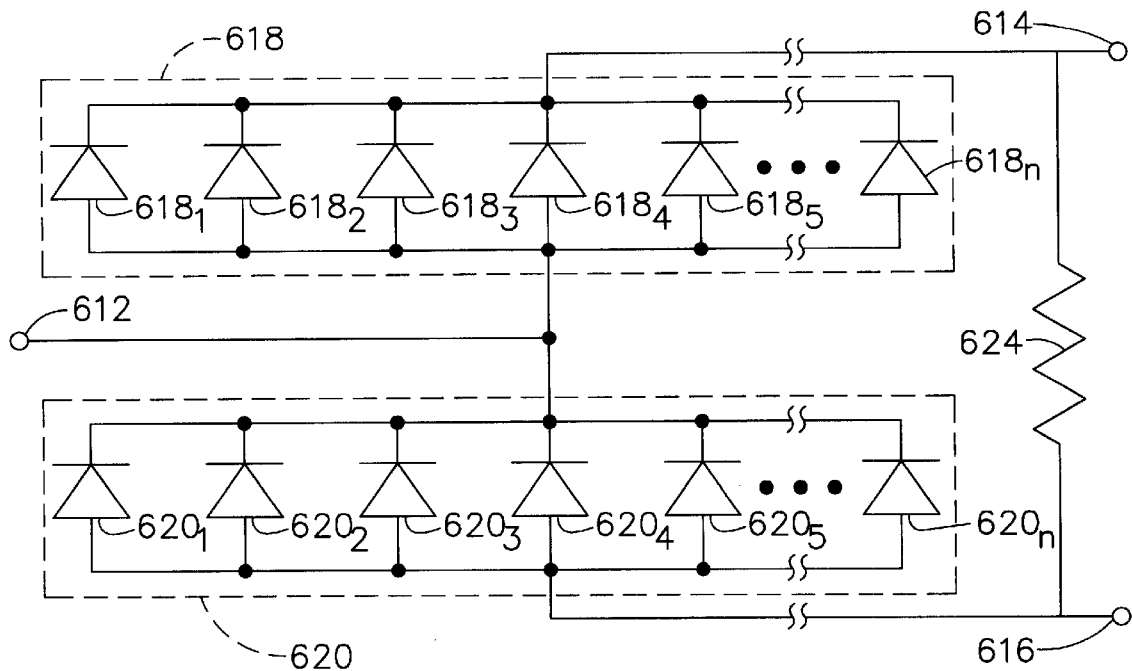
FIG. 7 is a generalized schematic representation of a single rectification circuit that forms a portion of the rotating rectifier circuit of FIG. 6.
Figure 8:
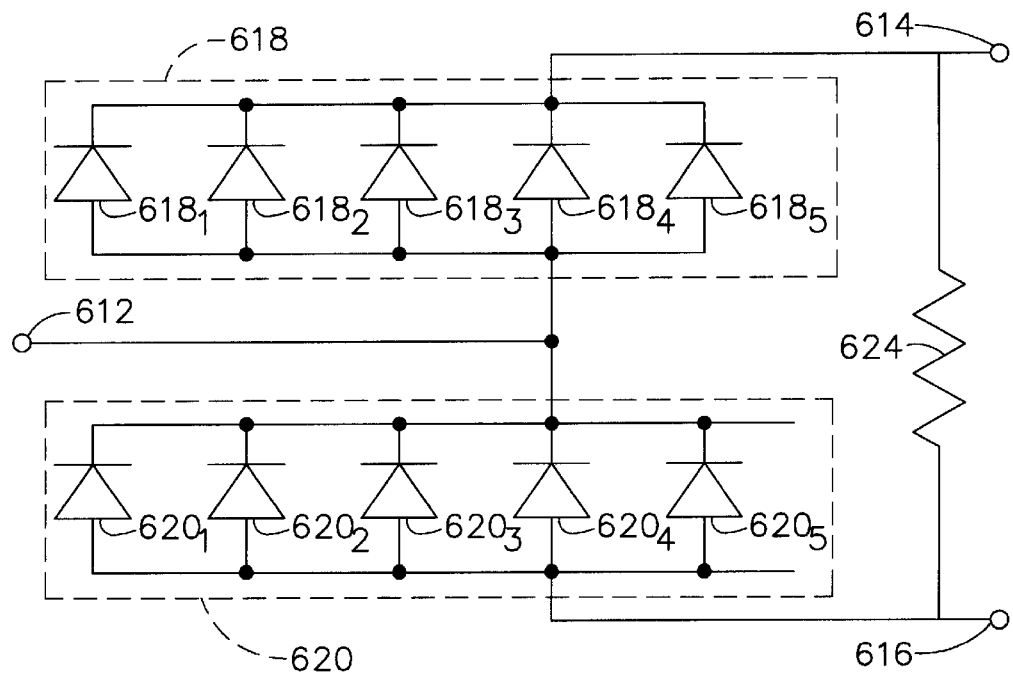
FIG. 8 is a schematic representation of a preferred embodiment of the single rectification circuit depicted in FIG. 7.

As was noted during the discussion of the structural aspects of the rectifier module assembly 100, for various reasons, such as reliability, the first and second diode circuits 618, 620 each comprise multiple diodes electrically connected in parallel one with another. It is noted, however, that the use of a single diode for each circuit is not precluded. For completeness, a schematic representation of a rectification circuit 602 with the first and second diode circuits 618, 620 generally depicted as comprising "n" individual, parallel connected diodes (e.g., 618-1, 618-2, . . . 618-n, 620-1, 620-2, . . . 620-n) is shown in FIG. 7. Additionally, FIG. 8 is a schematic representation of a preferred embodiment, in which the rectification circuit depicts the first and second diode circuits 618, 120 as comprising five individual diodes (e.g., 618-1, 618-2, 618-3, 618-4, 618-5, 620-1, 620-2, 620-3, 620-4, 620-5) electrically connected in parallel.

The rectifier module assembly and concomitant rectifier circuit of the present invention provide several advantages over known rotating rectifiers and circuits used in high speed generators. For example, the module components are integrally brazed to the conductive circuit runs, thus enhancing its structural reliability. The module is held in place in the exciter armature hub against machined flat portions by capture screws, nuts, and removable retaining clamps, which makes the modules relatively easy to replace, both collectively and individually. The placement of the modules within the exciter armature hub, which positions the module and the components mounted thereon at a fixed radial distance from the hub's center of rotation, ensures even centrifugal loading of all of the components. Moreover, the centrifugal loads during rotation force the diodes and resistor toward the module substrate. Because these loads are evenly distributed across, and equally amongst, the components, the structural reliability of the modules and components is enhanced. Providing a resistor for each module, which means that the rectification circuit for a multi-phase generator will comprise multiple resistors, increases overall circuit integrity and reliability. And finally, though certainly not inclusively, using a thin-film type resistor increases circuit reliability since the centrifugal loads on the resistor during generator rotation will be more evenly distributed than with the use of the conventional wire wound resistor.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A multi-pole high speed generator, comprising:
    an exciter including a plurality of exciter armature windings wound thereon; and
    one or more rectifier module assemblies each coupled to receive an AC signal generated in one of the plurality of exciter armature windings, each rectifier module comprising:
        a substantially flat base including a plurality of conductive circuit runs on a surface thereof, the base being dimensioned to mount within the exciter;
        a first diode circuit, including an anode and a cathode, having the anode electrically coupled to at least a first of said plurality conductive circuit runs;
        a second diode circuit, including an anode and a cathode, having its cathode electrically coupled to at least a second of said plurality of conductive circuit runs; and
        a conductive element electrically coupling together the cathode of said first diode circuit and the anode of said second diode circuit.

2. The generator of claim 1, further comprising:
    a resistive element electrically coupled between said first and second conductive circuit runs.

3. The generator of claim 2, wherein said resistive element comprises a thin-film resistor.

4. The generator of claim 1, further comprising:
    an AC input terminal electrically coupled to at least a third of said plurality of conductive circuit runs and to said conductive element.

5. The generator of claim 4, wherein said AC input terminal is configured to receive a connector for electrically coupling the rectifier module assembly to one of the plurality of exciter armature windings.

6. The generator of claim 1, further comprising:
    first and second DC output terminals electrically coupled to said first and said second conductive circuit runs, respectively.

7. The generator of claim 6, wherein said first and second DC output terminals are each configured to electrically couple the rectifier module assembly to a field winding in the multi-pole high speed generator.

8. The generator of claim 1, wherein said first and second diode circuits each comprise a plurality of individual diodes electrically connected in parallel with one another.

9. The generator of claim 8, wherein the plurality of individual diodes comprises five diodes electrically connected in parallel with one another.

10. The generator of claim 1, wherein said first and second diode circuits are coupled to said first and second conductive circuit runs, respectively, by a brazing process.

11. The generator of claim 1, wherein said conductive element is coupled to said first and second diodes by a brazing process.

12. The generator of claim 1, further comprising:
    a non-conductive substrate interposed between said substantially flat base and said plurality of conductive circuit runs.

13. The generator of claim 12, wherein said non-conductive substrate comprises ceramic.

14. The generator of claim 1, wherein said substantially flat base comprises a metallic material.

15. The generator of claim 1, wherein said plurality of conductive circuit runs each comprise copper.

16. The generator of claim 1, wherein said first and second diode circuits each comprise glass encapsulated diodes.

17. The generator of claim 1, wherein said base is dimensioned to mount axially within said exciter.

18. A rectifier module assembly for rectifying one phase of a multi-phase AC signal generated in a plurality of exciter armature windings wound on an exciter of a multi-pole high speed generator, comprising:
    a substantially flat base including a plurality of conductive circuit runs on a surface thereof, the base being dimensioned to mount within the exciter;
    a first diode circuit, including an anode and a cathode, having the anode electrically coupled to at least a first of said plurality conductive circuit runs;
    a second diode circuit, including an anode and a cathode, having its cathode electrically coupled to at least a second of said plurality of conductive circuit runs; and
    a conductive element electrically coupling together the cathode of said first diode circuit and the anode of said second diode circuit.

19. The rectifier module assembly of claim 18, further comprising:
    a resistive element electrically coupled between said first and second conductive circuit runs.

20. The rectifier module assembly of claim 19, wherein said resistive element comprises a thin-film resistor.

21. The rectifier module assembly of claim 18, further comprising:
an AC input terminal electrically coupled to at least a third of said plurality of conductive circuit runs and to said conductive element.

22. The rectifier module assembly of claim 21, wherein said AC input terminal is configured to receive a connector for electrically coupling the rectifier module assembly to one of the plurality of exciter armature windings.

23. The rectifier module assembly of claim 18, further comprising:
first and second DC output terminals electrically coupled to said first and said second conductive circuit runs, respectively.

24. The rectifier module assembly of claim 23, wherein said first and second DC output terminals are each configured to electrically couple the rectifier module assembly to a field winding in the multi-pole high speed generator.

25. The rectifier module assembly of claim 18, wherein said first and second diode circuits each comprise a plurality of individual diodes electrically connected in parallel with one another.

26. The rectifier module assembly of claim 25, wherein the plurality of individual diodes comprises five diodes electrically connected in parallel with one another.

27. The rectifier module assembly of claim 18, wherein said first and second diode circuits are coupled to said first and second conductive circuit runs, respectively, by a brazing process.

28. The rectifier module assembly of claim 18, wherein said conductive element is coupled to said first and second diodes by a brazing process.

29. The rectifier module assembly of claim 18, further comprising:
a non-conductive substrate interposed between said substantially flat base and said plurality of conductive circuit runs.

30. The rectifier module assembly of claim 29, wherein said nonconductive substrate comprises ceramic.

31. The rectifier module assembly of claim 18, wherein said substantially flat base comprises a metallic material.

32. The rectifier module assembly of claim 18, wherein said plurality of conductive circuit runs each comprise copper.

33. The rectifier module assembly of claim 18, wherein said first and second diode circuits each comprise glass encapsulated diodes.

34. The rectifier module assembly of claim 18, wherein said base is dimensioned to mount axially within the exciter.

35. A rectifier module assembly for rectifying one phase of a multiphase AC signal generated in a plurality of exciter armature windings of a multi-pole high speed generator, comprising:
a substantially flat base including a plurality of conductive circuit runs formed on a surface thereof;
a first diode circuit, including an anode and a cathode, having the anode electrically coupled to at least a first of said plurality conductive circuit runs;
a second diode circuit, including an anode and a cathode, having the cathode electrically coupled to at least a second of said plurality of conductive circuit runs;
a resistive element electrically coupled between said first and said second conductive circuit runs; and
a conductive element electrically coupling together the cathode of said first diode circuit and the anode of said second diode circuit.

36. The rectifier module assembly of claim 35, wherein said resistive element comprises a thin-film resistor.

37. The rectifier module assembly of claim 35, further comprising:
an AC input terminal electrically coupled to at least a third of said plurality of conductive circuit runs and to said conductive element.

38. The rectifier module assembly of claim 37, wherein said AC input terminal is configured to receive a connector for electrically coupling the rectifier module assembly to one of the plurality of exciter armature windings.

39. The rectifier module assembly of claim 35, further comprising:
first and second DC output terminals electrically coupled to said first and said second conductive circuit runs, respectively.

40. The rectifier module assembly of claim 39, wherein said first and second DC output terminals are each configured to electrically couple the rectifier module assembly to a field winding in the multi-pole high speed generator.

41. The rectifier module assembly of claim 35, wherein said first and second diode circuits each comprise a plurality of individual diodes electrically connected in parallel with one another.

42. The rectifier module assembly of claim 41, wherein the plurality of individual diodes comprises five diodes electrically connected in parallel with one another.

43. The rectifier module assembly of claim 35, wherein said first and second diode circuits are coupled to said first and second conductive circuit runs, respectively, by a brazing process.

44. The rectifier module assembly of claim 35, wherein said conductive element is coupled to said first and second diodes by a brazing process.

45. The rectifier module assembly of claim 35, further comprising:
a non-conductive substrate interposed between said substantially flat base and said plurality of conductive circuit runs.

46. The rectifier module assembly of claim 45, wherein said nonconductive substrate comprises ceramic.

47. The rectifier module assembly of claim 35, wherein said substantially flat base comprises a metallic material.

48. The rectifier module assembly of claim 35, wherein said plurality of circuit runs each comprise copper.

49. The rectifier module assembly of claim 35, wherein said first and second diode circuits comprise glass encapsulated diodes.

50. A rectifier module assembly for mounting within a hub of an exciter of a multi-pole high speed generator, comprising:
a substantially flat base including at least a first, a second, and a third conductive circuit run on a surface thereof;
a first DC output terminal electrically coupled to at least said first conductive circuit run;
a second DC output terminal electrically coupled to at least said second conductive circuit run;
an AC input terminal electrically coupled to at least said third conductive circuit run;
a first plurality of parallel-connected diodes, each including an anode and a cathode, and each having its anode electrically coupled to at least said first conductive circuit run;
a second plurality of parallel-connected diodes, each including an anode and a cathode, and each having its cathode electrically coupled to at least said second conductive circuit run;

a thin-film resistive element electrically coupled between said first and said second conductive circuit runs; and a conductive element electrically coupling together the cathodes of said first plurality of parallel-connected diodes, the anodes of said second plurality of parallel-connected diodes, and said AC input terminal.

51. The rectifier module assembly of claim 50, wherein said plurality of first and second parallel-connected diodes each comprise five individual diodes.

52. The rectifier module assembly of claim 50, further comprising:

a non-conductive substrate interposed between said substantially flat base and said first, second, and third conductive circuit runs.

53. The rectifier module assembly of claim 52, wherein said nonconductive substrate comprises ceramic.

54. The rectifier module assembly of claim 50, wherein said AC input terminal is configured to receive a connector for coupling the rectifier module assembly to a high speed generator exciter armature winding.

55. The rectifier module assembly of claim 50, wherein said first and second DC terminals are each configured to couple the rectifier module assembly to a high speed generator field winding.

56. The rectifier module assembly of claim 50, wherein said base comprises a metallic material.

57. The rectifier module assembly of claim 50, wherein of said first, second, and third conductive runs, and said conductive element, each comprise copper.

58. A rectifier circuit for rectifying a multi-phase AC signal generated in a plurality of exciter armature windings of a multi-pole high speed generator and providing a DC signal to a field winding of the generator, the rectifier circuit comprising:

a plurality of parallel-connected rectification circuits each including (i) an AC input terminal for receiving one phase of the multi-phase AC signal and (ii) first and second DC output terminals for providing the DC signal to the field winding, wherein each of said plurality of rectification circuits comprises:

a first diode circuit having its anode electrically coupled to said AC input terminal and its cathode electrically coupled to said first DC output terminal;

a second diode circuit having its cathode electrically coupled to said AC input terminal and its anode electrically coupled to said second DC output terminal; and a resistive element electrically coupled between said first and second DC output terminals.

59. The rectifier circuit of claim 58, wherein said first and second diode circuits each comprise a plurality of individual diodes electrically connected in parallel with one another.

60. The rectifier circuit of claim 59, wherein the plurality of individual diodes comprises five individual diodes electrically connected in parallel with one another.

61. The rectifier circuit of claim 58, wherein said resistive element comprises a thin-film resistive element.

62. The rectifier circuit of claim 58, wherein each of said plurality of rectification circuits is formed on a substantially flat base dimensioned to mount axially within a hub onto which the plurality of exciter armature windings are mounted.

63. The rectifier circuit of claim 62, wherein each of said plurality of rectification circuits is mounted within the hub, and spaced equidistant from a center of the hub and equidistant around a circumference thereof.

64. A modular rectifier circuit for rectifying one phase of a multi-phase AC signal generated in a plurality of exciter armature windings wound on an exciter hub that is configured to rotate about a rotational axis in a multi-pole high speed generator, comprising:

a substantially flat base having one or more components that comprise the rectifier circuit mounted on a first surface thereof, said base being dimensioned to removably mount within the exciter hub in a configuration whereby the first surface is in a plane that does not intersect the rotational axis; and a plurality of terminals mechanically coupled to said base, each of said plurality of terminals being configured to receive a fastener.

65. The modular rectifier circuit of claim 64, wherein said plurality of terminals includes an AC input terminal, and first and second DC output terminals.

66. The modular rectifier circuit of claim 65, wherein said AC input terminal includes an open-ended slot for receiving a fastener therein.

67. The modular rectifier circuit of claim 65, wherein said first and second DC output terminals each include openings for receiving a fastener therein.

* * * * *